United States Patent [19]

Sorensen

[11] Patent Number: 5,463,628

[45] Date of Patent: Oct. 31, 1995

[54] DATA NETWORK INTERFACE

[75] Inventor: Lars S. Sorensen, Copenhagen, Denmark

[73] Assignee: Motorola, Schaumburg, Ill.

[21] Appl. No.: 808,825

[22] Filed: Dec. 17, 1991

[30] Foreign Application Priority Data

May 12, 1990 [GB] United Kingdom ............... 9010722
May 6, 1991 [WO] WIPO ........................ EP91/00853

[51] Int. Cl.[6] ................................... H04J 3/12
[52] U.S. Cl. ............... 370/110.1; 370/60; 370/94.1; 379/59; 455/33.1
[58] Field of Search .................... 370/110.1, 84, 370/60, 94.1, 95.3, 95.1, 68.1; 379/63, 59; 455/33.1

[56] References Cited

U.S. PATENT DOCUMENTS

| | | | |
|---|---|---|---|
| 4,720,850 | 1/1988 | Oberlander et al. | 370/60 |
| 4,953,180 | 8/1990 | Fieschi et al. | 375/7 |
| 4,999,836 | 3/1991 | Fujiwara | 370/110.1 |
| 5,060,241 | 10/1991 | Allouis et al. | 370/68.1 |
| 5,128,934 | 7/1992 | Jasinski | 379/59 |
| 5,131,019 | 7/1992 | Sheffer et al. | 379/59 |
| 5,168,498 | 12/1992 | Adams et al. | 370/94.1 |
| 5,179,720 | 1/1993 | Grube et al. | 379/59 |
| 5,278,890 | 1/1994 | Beeson,Jr. et al. | 370/94.1 |

OTHER PUBLICATIONS

Nakajima et al., "Radio Channel Structure for SCPC/FDMA Digital Mobile Systems", 38th IEEE Vehicular Technology Conference, Jun. 15–17, 1988 pp. 623–628.

Busschaert et al., "A Rate Adaption Coprocessor for Terminal Adapters and U–interface Modems", IEEE Journal of Solid–State Circuits, vol. 24, No. 6, Dec. 1989, pp. 1625–1633.

Felix, "Packet Switching in Digital Cellular Systems", 38th IEEE Vehicular Technology Conference, Jun. 15–17, 1988, pp. 414–418.

F. C. Owen, 'The DECT radio interface' IEE Colloquium on CT2/CA1 and DECT Cordless Telecommunications (Digest No. 165) London, UK 27 Nov. 1990.

Primary Examiner—Douglas W. Olms
Assistant Examiner—Shick Hom
Attorney, Agent, or Firm—Daniel W. Juffernbruch

[57] ABSTRACT

This invention relates to an interface for interfacing between two different types of networks, such as a GSM cellular radio network and an integrated services digital network (ISDN). The interface communicates between channels of one such network with channels of the other such network by mapping control information between the first (D) and second (Dm) control channels. In a first state of operation, the interface maps data between the first (B1, B2) and the second (Bm) data channels under the control of control information on the control channels. In a second state of operation, the interface maps data between the first control channel (D) and the second data channel (Bm) under the control of control information on the control channel.

18 Claims, 3 Drawing Sheets

MAPPING

DATA NETWORK INTERFACE

BACKGROUND OF THE INVENTION

This invention relates to an interface for interfacing between two different types of networks, such as a GSM cellular radio network and an integrated services digital network (ISDN).

This is a continuation of international patent application Ser. No. PCT/EP91/00853 filed on May 6, 1991 in the European Patent Office and designating the United States, now abandoned.

An ISDN network provides communications on two traffic channels (usually labelled B1 and B2) and a control channel (usually referred to as the D channel). The bandwidth of the traffic channels makes them capable of carrying 64 kB/s per channel and the control channel is capable of carrying up to 16 kB/s.

The GSM (Groupe Speciale Mobile) cellular radio system provides communications on a traffic channel carrying 13 kB/s of speech or 12 or 9.6 kB/s of data. The GSM system provides a control channel of up to 1 kB/s.

It is desirable in the manufacture of GSM equipment to provide an interface (usually referred to as the S interface) for connection of ISDN compatible equipment. Thus, for example, an ISDN telephone, fax, answering machine or other such equipment can be plugged into a GSM mobile transceiver and operated from a vehicle or other remote GSM subscriber equipment.

Manufacturers of ISDN compatible equipment propose to provide the facility of transmitting packets of data on the D channel. For example, a number of ISDN telephones could be installed on a fixed network and a supervision device might transmit data on the D channel. The devices could initiate a connection to a supervisor computer without initiating a call. ISDN service operators might charge lower fees for transmitting a packet of data on the D channel, rather than establishing a point-to-point communication on the B2 channel. Other uses for data on the D channel would include credit card checking, supervision and alarm systems, broadcast message services etc.

It is a problem with connection of ISDN equipment to GSM equipment that the GSM control channel does not have the capacity for supporting data from the ISDN control channel.

SUMMARY OF THE INVENTION

According to the present invention, there is provided an interface for communicating between first and second data channels and first and second control channels, said interface comprising: means for mapping control information between the first and second control channels; means for mapping data, in a first state of operation, between the first and second data channels under the control of control information on the control channels; and means for mapping data, in a second state of operation, between the first control channel and the second data channel under the control of control information on the control channel.

In this way, packets of data on the ISDN D channel are recognised as being data and these are mapped across onto the GSM traffic channel in packet form. In this way, the packets of data on the ISDN channel are not lost. Furthermore, the breadth of equipment types that can be connected to a GSM mobile unit is increased.

DETAILED DESCRIPTION OF THE INVENTION

Figure 1:
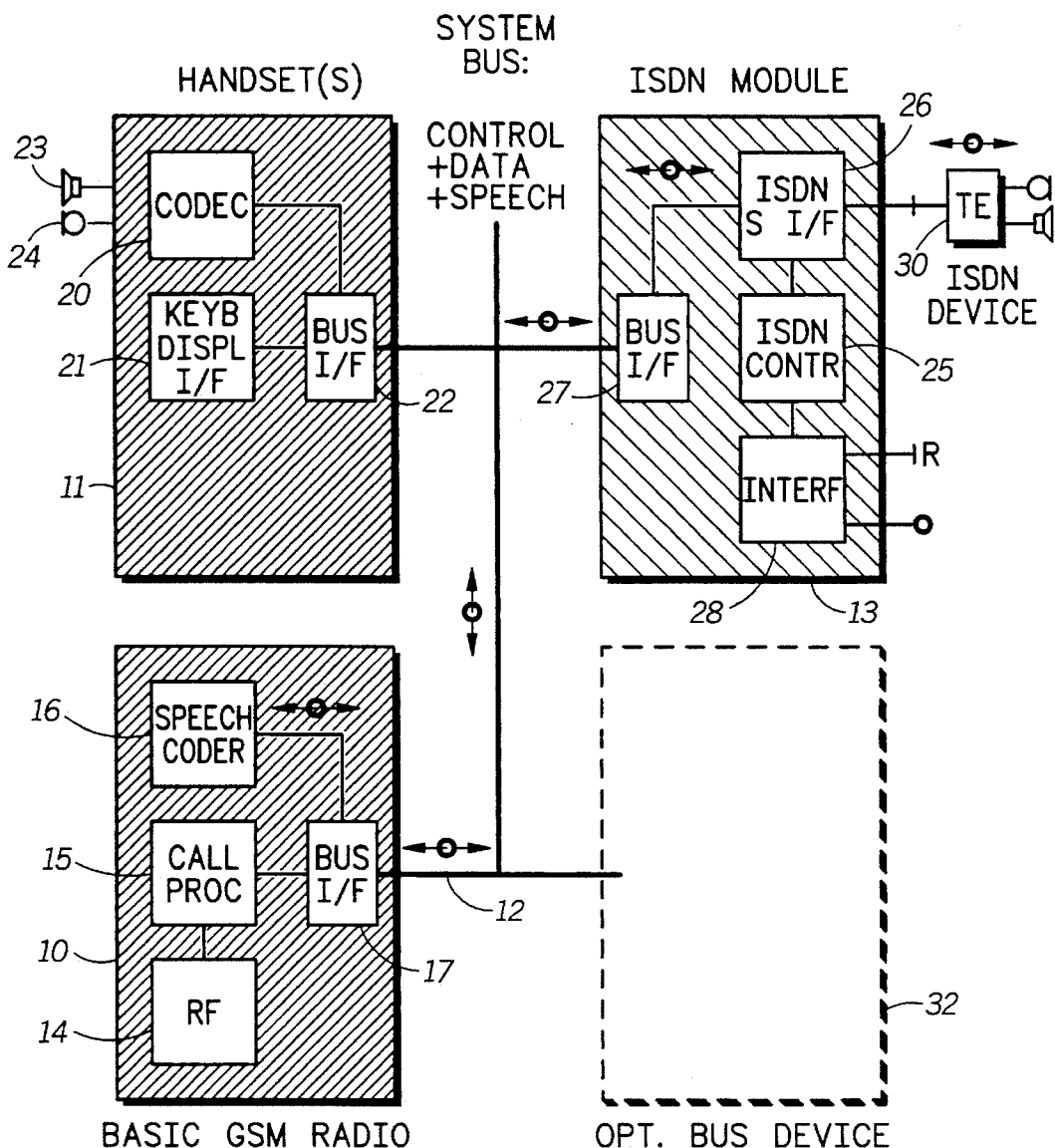
FIG. 1 shows a GSM radio having an ISDN interface and an ISDN device connected thereto.

Referring to FIG. 1, there is shown a GSM radio comprising a transceiver part 10, a handset 11, a system bus 12, and an ISDN module 13. The transceiver 10 comprises a speech coder 14, a call processor 15, an RF module 16 and a bus interface 17. The handset 11 comprises a codec 20, a keyboard display interface 21, a bus interface 22, a loudspeaker 23 and a microphone 24. The ISDN module comprises an ISDN controller 25, an ISDN S interface 26, a bus interface 27 and a further interface 28. Attached to the ISDN S 26 is shown an ISDN telephone 30.

Another optional bus device 32 may be connected to the bus 12.

The bus 12 is a wide bandwidth bus for carrying control information, data and speech simultaneously or in a time division multiplexed manner. The control information, data and speech are communicated and controlled separately between the elements 10, 11 and 13 of the GSM radio on the GSM control data and speech channels. Other functional commands internal to the GSM radio are supported by the bus 12.

Under control of the ISDN controller 25, the ISDN S interface 26 maps decoded speech from the speech coder 16 at a net bit rate of 64 kB/s to the ISDN B 1 channel at a net bit rate of 12 kB/s (in bursts of 192 kB/s). Likewise, the ISDN S interface 26 maps data received from the transceiver 10 at a net bit rate of 12 kB/s, or less depending on which data rate is used, on the GSM data channel to a net bit rate of 64 kB/s (in bursts of 192 Kb/s) on the ISDN B2 channel. The channels B1 and B2 can indpendently be used for either speech or data.

Figure 2:
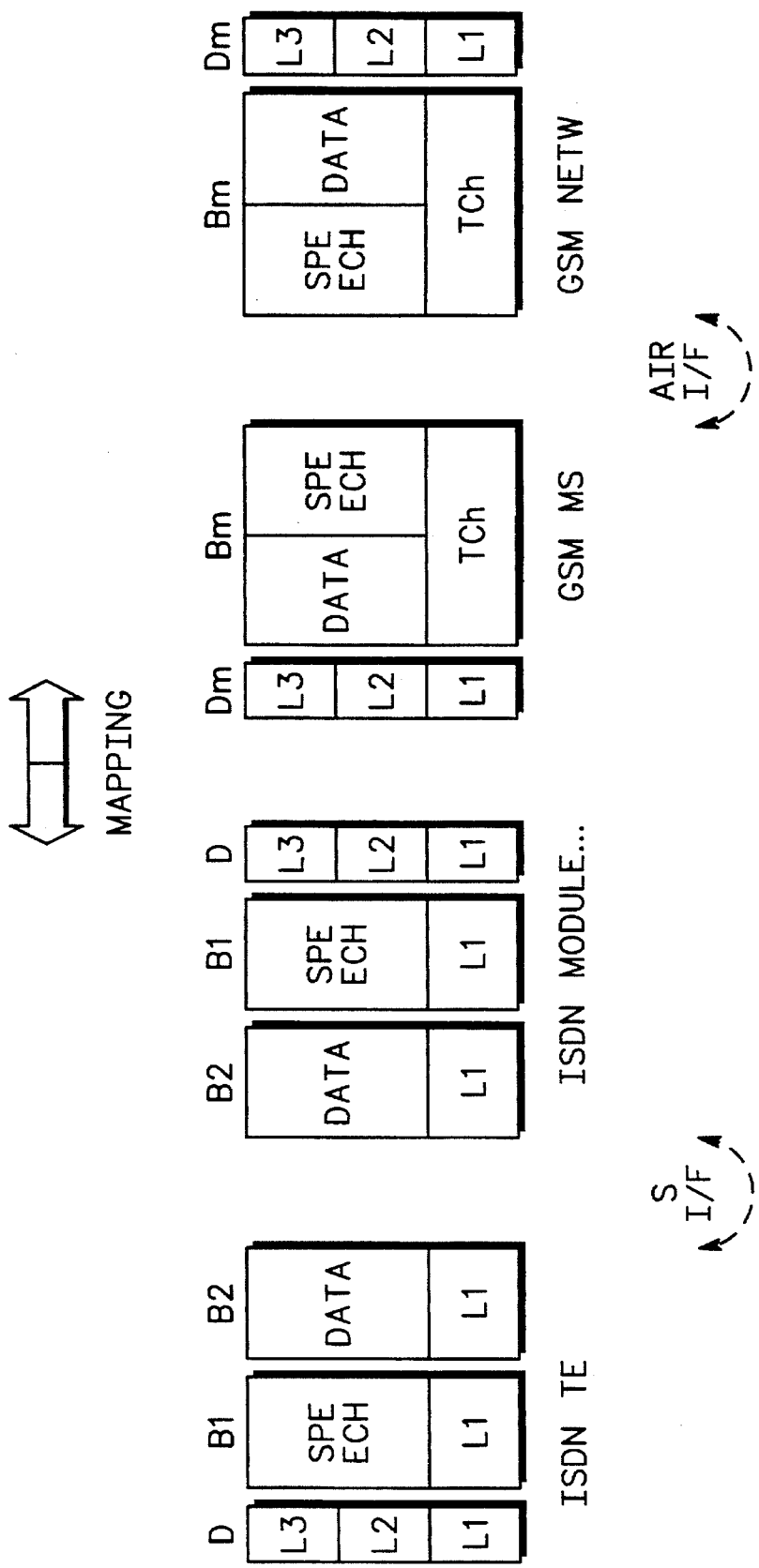
FIG. 2 shows the three layers of the different channels of the GSM/ISDN interface in accordance with the preferred embodiment of the invention.

The mapping is shown in greater detail in FIG. 2. In that figure, the left hand side represents the ISDN telephone or other equipment and the right hand side represents the GSM transceiver and the GSM network.

Referring to the control channels of the two systems, these are represented as the D channel in the ISDN system and the Dm channel in the GSM system. Each of these channels comprises three layers, as described in the respective specifications of the systems. These layers are represented as L1, L2 and L3. Control information is mapped directly between these layers in the respective channels. Look-up tables and bit rate converters are used as necessary by the ISDN controller 25 to perform the mapping.

Data and speech are mapped between the respective layers of the data and speech channels of the two systems. Thus, where information is present on the B2 channel of the ISDN network, this is presented as data on the Bm channel of the GSM network and vice versa. Where information is present on the B1 of the ISDN network, this is presented as digitised speech on the Bm of the GSM network and vice versa.

Figure 3:
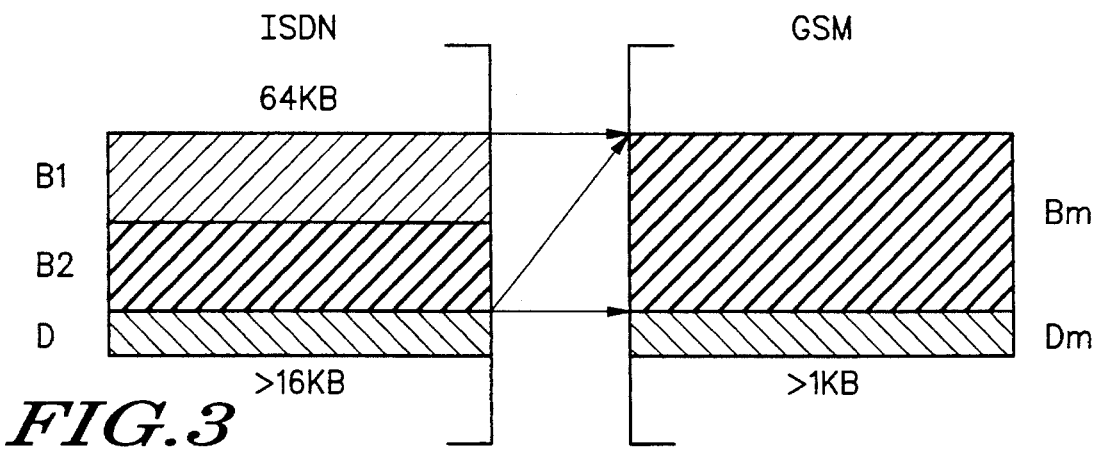
FIG. 3 shows the mapping of data in accordance with the preferred embodiment of the invention.

FIG. 3 represents the mapping between the GSM and ISDN channels shown in FIG. 2 with additional mapping in accordance with the invention. The information represented by the shaded portions of FIG. 3 is layer 2.

Where a packet of data is presented on the ISDN D channel, the packet is recognised by the ISDN controller 25 by virtue of the operation code at the start of the packet. A data packet is recognized at layer 2 by the address field in the layer 2 frame. Connection is then established to a packet handler (of the users choice, pre-programmed in the IDS). The ISDN controller 25 maps this data onto the GSM Bm channel in the form of a packet having an appropriate GSM operation code indicating that the information is a packet of data. Since the Bm channel of the GSM network has a bandwidth of 12 or 9.6 kB/s, it can support a packet of data received from the 16 kB/s wide D channel of the ISDN network, provided there is sufficient memory in the ISDN module 13 to store the packet and re-transmit it at the reduced data rate.

At layer 1 there is no way of distinguishing control from data. This distinction is made at layer 2, by means of the address field in the LAPD frames. There is no need to interpret and map the layer 3 information, which is passed as is. The mapping is done at layer 2 by extracting the information from the layer 2 (LAPD) frames, and packing this into GSM layer 2 frames (RLP frames). The layer 3 information merely has to be monitored to see when a disconnection is made (disconnection is done by means of a layer 3 disconnection message).

Figure 4:
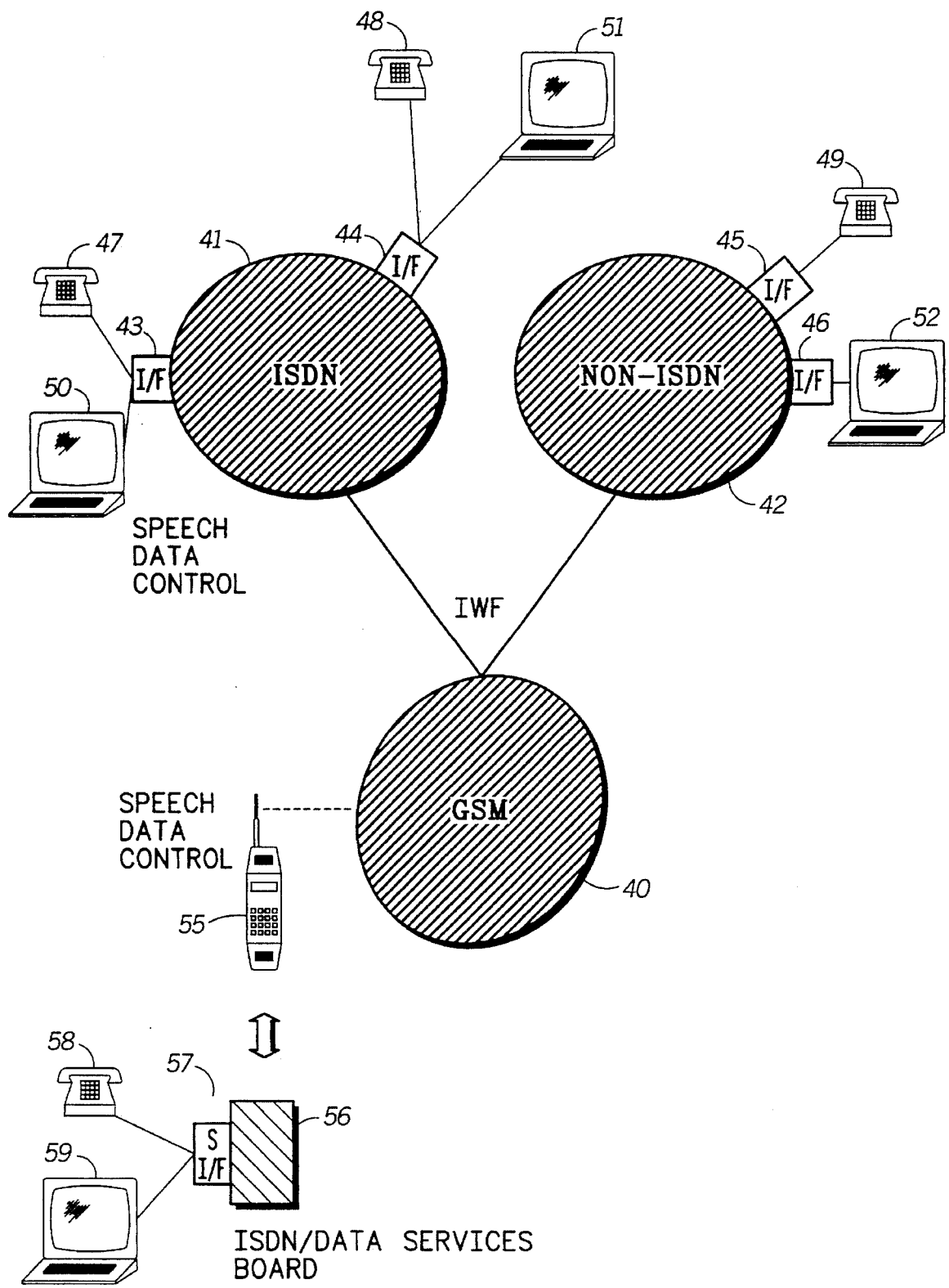
FIG. 4 shows a system employing the invention.

Referring to FIG. 4, a communications system is shown as an example of an application for the invention.

This system comprises a GSM network 40 connected to an ISDN network 41 and a non-ISDN network 42. Each of the networks 41 and 42 has interfaces 43, 44, 45 and 46 for connection to telephones 47, 48, 49, personal computers 50, 51 and 52 etc. Communicating with the GSM network 40 is a GSM portable radio 55. Connectable to the radio 55 via a system bus is an ISDN module 56. The module 56 could be an add-on board inserted within the housing of the radio and telephone 55. The module 56 has an S interface 57, to which is connected a telephone 58 and a computer 59.

The portable radio telephone 55 can make calls via the GSM network 40 to any one of the telephones 47 to 49. In addition, by means of an ordinary modem link, the radio telephone 55 can communicate with the computer 52.

In addition to the above communications, the computer 50 is arranged to periodically generate data messages on the ISDN control channel. These messages are in packet form and are recognised by the ISDN system 41, which routes them to their destination, for example computer 51, according to the address contained in the packet. Thus, a message can be passed from computer 50 to computer 51 without a communications channel being set up between those elements.

In addition, the computer 59 is similarly arranged to generate data messages on the control channel. These messages are recognised by the ISDN module 56 and the radio telephone 55 requests allocation of a channel on the GSM network 40 by transmission of the appropriate GSM channel request signal. Handshake is established between the radio telephone 55 and the GSM system 40 and the data message is transmitted to this system 40 on the GSM traffic channel. The GSM system 40 routes the data message to the destination identified in the packet, for example a unit connected to system 41 or system 42. Where the packet of data is sent on to other ISDN equipment, a further mapping may be carried out between the GSM system 40 and the ISDN system 41, mapping the message back to the ISDN control channel. This message may then be transmitted to, for example, computer 50 without setting up a traffic channel between the GSM system 40 and the computer 50.

Conversely, when one of the items of equipment 47, 48, 50, 51 connected to ISDN network 41 generates a data message on the control channel with an address which identifies an item of GSM subscriber equipment, (eg radio telephone 55), the message is passed from the ISDN network 41 to the GSM network 42 and in so doing it is mapped from the ISDN control channel to the GSM traffic channel and the GSM system 40 polls the radio telephone 55 for establishing a call. The radio telephone 55 responds (if it is capable of doing so) and handshake is established, whereby the message is passed to the radio telephone 55 by means of the traffic channel. The ISDN module 56 may map the message across again to the ISDN control channel and on that channel the data can be passed to the ISDN peripheral equipment 58 or 59.

Whenever a connection is established, this is a duplex channel. Both the GSM air interface connection and the ISDN D channel connection are duplex, so data may be mapped in both directions. Also in the case of an incoming data call, this is offered to all devices. If one of the devices wishes to accept the call it can do so, and also indicate that it wishes the data to be transferred on the D-channel.

I claim:

1. An interface for communicating between a first system and a second system, the first system including a first traffic data channel and a first control channel, the second system including a second traffic data channel and a second control channel, said interface comprising:

means for mapping control information between the first control channel and the second control channel;

first means for mapping traffic data, in a first state of operation, between the first traffic data channel and the second traffic data channel under control of the control information on the first control channel and the second control channel; and second means for mapping traffic data, in a second state of operation, between the first control channel and the second traffic data channel under control of the control information on the first control channel.

2. An interface according to claim 1, wherein said second means for mapping traffic data in the second state of operation comprises means for mapping between circuit switched data on said first control channel and packets of data on said second traffic data channel.

3. An interface according to claim 2 comprising means for identifying an operation code on said first control channel indicative of a packet of data on that control channel, thereby obtaining said control information, and means, responsive to said means for identifying, for mapping the data of said data packets to said second traffic data channel.

4. An interface according to claim 1, further comprising means for distinguishing between different data messages received on the second traffic data channel and for selecting messages and outputting selected messages on the first control channel.

5. An interface according to claim 1 comprising means for establishing a duplex data communication path between the first control channel and the second traffic data channel.

6. An interface according to claim 1, wherein the capacity of the first control channel is greater than the capacity of the second control channel but not greater than the capacity of the second traffic data channel.

7. An interface according to claim 6, wherein the first traffic data channel and the first control channel are ISDN channels and the second traffic data channel and the second control channel are GSM channels.

8. An interface according to claim 1, for mapping information from an ISDN network to a GSM network, wherein the interface receives data from an ISDN traffic channel and both receives data and control information from an ISDN D channel and in a first state outputs the data from the ISDN traffic channel to a GSM traffic channel and in a second state outputs the data from the ISDN D channel to the GSM traffic channel and in both states receives control information from the ISDN D channel and outputs the control information on a GSM control channel.

9. An interface according to claim 1, for mapping information from a GSM network to an ISDN network, wherein the interface receives data from a GSM traffic channel and receives control information from a GSM control channel and in a first state outputs the data from the GSM traffic channel to an ISDN traffic channel and in a second state outputs the data from the GSM control channel to an ISDN D channel and in both states receives control information from the GSM control channel and outputs the control information on the ISDN D channel.

10. An interface for communicating between a first system and a second system, the first system including a first traffic data channel and a first control channel, the second system including a second traffic data channel and a second control channel, said interface comprising:

first means, operable in a first state of operation, for receiving first control information from the first control channel and outputting corresponding first control information on the second control channel and for receiving second control information from the second control channel and outputting corresponding second control information on the first control channel;

second means, operable in said first state of operation, for receiving first data from the first traffic data channel and outputting corresponding first data on the second traffic data channel and for receiving second data from the second traffic data channel and outputting corresponding second data on the first traffic data channel; and said second means being operable in a second state of operation for receiving third data from the first control channel and outputting corresponding third data on the second traffic data channel under control of the control information on the first control channel.

11. An interface according to claim 10, further comprising look-up means for translating first control information on said first control channel to corresponding first control information on said second control channel.

12. An interface according to claim 10, further comprising look-up means for translating first control information on said second control channel to corresponding first control information on said first control channel.

13. An interface for communicating between a first system and a second system, the first system including a first traffic data channel and a first control channel, the second system including a second traffic data channel and a second control channel, said interface comprising:

first means, operable in a first state of operation, for receiving first control information from the first control channel and outputting corresponding first control information on the second control channel and for receiving second control information from the second control channel and outputting corresponding second control information on the first control channel;

second means, operable in said first state of operation, for receiving first data from the first traffic data channel and outputting corresponding first data on the second traffic data channel and for receiving second data from the second traffic data channel and outputting corresponding second data on the first traffic data channel; and means for receiving an instruction on the first control channel for switching to a second state of operation, said second means for receiving first data being operable in a second state of operation for receiving third data from the first control channel and outputting corresponding third data on the second traffic data channel.

14. An interface according to claim 13, further comprising look-up means for translating first control information on said first control channel to corresponding first control information on said second control channel.

15. An interface according to claim 13, further comprising look-up means for translating first control information on said second control channel to corresponding first control information on said first control channel.

16. An interface for communicating between a first system and a second system, the first system including a first traffic data channel and a first control channel, the second system including a second traffic data channel and a second control channel, said interface comprising:

first means, operable in a first state of operation, for receiving first control information from the first control channel and outputting corresponding first control information on the second control channel and for receiving second control information from the second control channel and outputting corresponding second control information on the first control channel;

second means, operable in said first state of operation, for receiving first data from the first traffic data channel and outputting corresponding first data on the second traffic data channel and for receiving second data from the second traffic data channel and outputting corresponding second data on the first traffic data channel; and means for receiving an instruction on the first control channel for switching to a second state of operation, said second means for receiving first data being operable in a second state of operation for receiving third data from the second traffic data channel and outputting corresponding third data on the first control channel.

17. An interface according to claim 16, further comprising look-up means for translating first control information on said first control channel to corresponding first control information on said second control channel.

18. An interface according to claim 16, further comprising look-up means for translating first control information on said second control channel to corresponding first control information on said first control channel.

* * * * *